(12) United States Patent
Colman et al.

(10) Patent No.: US 11,408,424 B2
(45) Date of Patent: Aug. 9, 2022

(54) DRIVE FOR A COMPRESSOR ELEMENT AND WATER INJECTED COMPRESSOR DEVICE PROVIDED WITH SUCH A DRIVE

(71) Applicant: ATLAS COPCO AIRPOWER, NAAMLOZE VENNOOTSCHAP, Wilrijk (BE)

(72) Inventors: Luc Lodewijk Anna Colman, Wilrijk (BE); Pieter Cools, Wilrijk (BE); Viktor Maurits Vriens, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 530 days.

(21) Appl. No.: 16/325,798

(22) PCT Filed: Oct. 30, 2017

(86) PCT No.: PCT/IB2017/056714
§ 371 (c)(1),
(2) Date: Feb. 15, 2019

(87) PCT Pub. No.: WO2018/083579
PCT Pub. Date: May 11, 2018

(65) Prior Publication Data
US 2020/0200177 A1    Jun. 25, 2020

(30) Foreign Application Priority Data

Nov. 3, 2016  (BE) .................................. 2016/5818

(51) Int. Cl.
*F04C 29/02* (2006.01)
*F04C 23/02* (2006.01)
(Continued)

(52) U.S. Cl.
CPC .............. *F04C 29/02* (2013.01); *F04C 23/02* (2013.01); *F04C 29/04* (2013.01); *H02K 5/1675* (2013.01);
(Continued)

(58) Field of Classification Search
CPC .......... F04C 29/02; F04C 23/02; F04C 29/04; F04C 2210/208; F04C 2240/20;
(Continued)

(56) References Cited

U.S. PATENT DOCUMENTS 5,222,874 A    6/1993  Unnewehr et al.
6,629,829 B1 * 10/2003 Shinoda .................. F01C 21/02
                                                418/102
(Continued)

FOREIGN PATENT DOCUMENTS

CN      104285359 A    1/2015
EP       1580434 A1    9/2005
(Continued)

OTHER PUBLICATIONS

International Search Report in related PCT Application No. PCT/IB2017/056714, dated Feb. 2, 2018.
(Continued)

*Primary Examiner* — Connor J Tremarche
(74) *Attorney, Agent, or Firm* — Bacon & Thomas, PLLC (57) ABSTRACT

An actuator for a compressor element, the actuator comprising an electrical motor with a motor casing which defines a motor chamber in which a motor rotor is positioned rotatably with the help of one or more motor bearings in relation to a motor stator, whereby the motor stator is built of laminations around which windings are attached and whereby the motor rotor is built of a shaft with laminations, whereby the actuator is further equipped with a cooling circuit for a coolant, wherein the coolant is water, the motor
(Continued)

bearings are water-lubricated, the shaft on the motor rotor is made from stainless steel, the windings are embedded in an epoxy resin and a composite sleeve is applied around each of the laminations on the motor rotor and on the motor stator.

17 Claims, 5 Drawing Sheets

(51) Int. Cl.
| | | |
|---|---|---|
| *F04C 29/04* | (2006.01) | |
| *H02K 5/167* | (2006.01) | |
| *H02K 5/20* | (2006.01) | |
| *H02K 7/08* | (2006.01) | |
| *H02K 7/14* | (2006.01) | |
| *H02K 9/19* | (2006.01) | |
| *H02K 9/26* | (2006.01) | |
| *B01D 35/02* | (2006.01) | |

(52) U.S. Cl.
CPC ............... *H02K 5/20* (2013.01); *H02K 7/085* (2013.01); *H02K 7/14* (2013.01); *H02K 9/19* (2013.01); *H02K 9/26* (2013.01); *B01D 35/02* (2013.01); *F04C 2210/208* (2013.01); *F04C 2240/20* (2013.01); *F04C 2240/30* (2013.01); *F04C 2240/50* (2013.01); *H02K 2205/09* (2013.01)

(58) Field of Classification Search
CPC ............. F04C 2240/30; F04C 2240/50; H02K 5/1675; H02K 5/20; H02K 7/085; H02K 7/14; H02K 9/19; H02K 9/26; H02K 2205/09; B01D 35/02
USPC ........................................ 417/410.1
See application file for complete search history.

(56) References Cited

U.S. PATENT DOCUMENTS

| | | | |
|---|---|---|---|
| 2004/0086396 A1 | 5/2004 | De Smedt et al. | |
| 2005/0073204 A1* | 4/2005 | Puterbaugh | H02K 5/10 310/89 |
| 2007/0241627 A1* | 10/2007 | Kharsa | F04C 29/0085 310/156.08 |
| 2008/0260562 A1 | 10/2008 | Van Der Heggen et al. | |
| 2010/0019589 A1 | 1/2010 | Saban et al. | |
| 2012/0074807 A1* | 3/2012 | Burton | H02K 1/278 310/156.28 |
| 2015/0023826 A1* | 1/2015 | Desiron | F04C 28/06 418/205 |
| 2015/0108859 A1 | 4/2015 | Nakazumi et al. | |
| 2015/0288231 A1* | 10/2015 | Jahnz | H02K 3/00 310/59 |
| 2016/0156251 A1* | 6/2016 | Sakurai | H02K 1/32 310/54 |

FOREIGN PATENT DOCUMENTS

| | | |
|---|---|---|
| EP | 1718879 B1 | 5/2008 |
| GB | 2376505 A | 6/2001 |
| JP | 2007143245 A | 6/2007 |
| JP | 2008101538 A | 5/2008 |
| JP | 2012152083 A | 8/2012 |
| WO | 2013126970 A1 | 9/2013 |
| WO | 2014042630 A1 | 3/2014 |

OTHER PUBLICATIONS

Written Opinion in related PCT Application No. PCT/IB2017/056714, dated Feb. 2, 2018.

* cited by examiner

DRIVE FOR A COMPRESSOR ELEMENT AND WATER INJECTED COMPRESSOR DEVICE PROVIDED WITH SUCH A DRIVE

The present invention relates to an actuator for a compressor element.

BACKGROUND OF THE INVENTION

Water-injected compressor elements utilise an actuator to convert electrical energy into oil-free compressed gas, for example though not necessarily air that can for example be used in the pharmaceutical industry or in the food industry, wherever compressed air is required.

Traditionally an actuator or motor is used that is lubricated and cooled with oil. The necessary seals are provided between the actuator and the compressor element, to prevent oil contamination of the compressed gas and to prevent any water from being able to enter the actuator and causing problems such as corrosion and/or short circuits.

These seals concern a "shaft seal" around the shaft of the motor rotor. A so-called "contact seal" is often employed for such applications.

A first disadvantage is that such a shaft seal always causes a loss of power and therefore also reduces the efficiency of the machine.

Another disadvantage of this is that such shaft seals have a limited lifespan because they are prone to wear and tear and must be replaced regularly. For example, if such a "contact seal" is not carefully replaced there is considerable potential for leaks to occur.

Furthermore, when seals fail, oil ends up in the compressed gas, which is unacceptable for certain applications.

In addition, water can enter the actuator, which can cause corrosion and/or a short circuit. Both consequences can cause the actuator to fail or malfunction.

SUMMARY OF THE INVENTION

The purpose of the present invention is to provide a solution to at least one of the aforementioned and/or other disadvantages, by providing an actuator which is both lubricated and cooled with water.

The present invention features an actuator for a compressor element, with the actuator including an electric motor with a motor casing which defines a motor chamber in which a motor rotor is placed rotatably using one or motor bearings in relation to a motor stator, whereby the motor stator is built of laminations around which windings are attached and whereby the motor rotor is built of a shaft with laminations, whereby the actuator is further equipped with a cooling circuit for a coolant characterized in that the coolant is water, that the motor bearings are water-lubricated, that the shaft on the motor rotor is made of stainless steel, that the aforementioned windings are embedded in an epoxy resin and that around each of the laminations of the motor rotor and the motor stator a composite sleeve has been fitted.

An advantage is that, thanks to provisions made in the actuator, the entire actuator can be both cooled and lubricated with water without any risk of a short circuit and corrosion.

Indeed, the epoxy resin will protect the windings on the motor stator, which are often made of copper, while the composite sleeves will protect the laminations on the motor rotor and motor stator.

By providing water-lubricated bearings there is no need to use lubricating oil in the actuator and, in other words, this is 100% oil-free.

By using this actuator to drive a water-injected compressor element, compressed gas can be generated that is 100% oil-free and has the so-called "class zero oil free" ISO certification.

Furthermore, the actuator does not need to be sealed off in relation to the compressor element, as there are no risks of water from the injection circuit in the compressor element damaging the actuator.

The negative effects of a failure in the seals between the actuator and the compressor element are therefore entirely avoided. As such seals are no longer necessary, the assembly of the machine is simplified.

An additional advantage concerns the fact that the epoxy resin is better able to remove heat than air. In a traditional actuator, the heads of the windings are exposed to the air, but in an actuator according to the invention these heads are embedded or surrounded by epoxy resin. Heat is conducted better by this epoxy resin than by air, making the cooling more efficient.

In a practical embodiment, the motor casing is fitted with a sleeve, which forms the motor chamber and a flange, which seals off the sleeve, whereby the flange is equipped with a space into which the live wires enter, whereby a seal is provided between the aforementioned flange and the stator enclosed in epoxy.

An advantage is that the live wires, that provide electrical current to the actuator, are protected from the water.

As the aforementioned seal is clamped between two static parts of the actuator, it almost entirely avoids wear and tear and the use of this seal will not cause any loss of power in the machine.

The invention also involves a water-injected compressor device with a water-injected compressor element comprising a compressor casing which defines a compressor chamber in which one or more compressor rotors are attached, whereby the compressor element features a water injection circuit whereby it is fitted with an actuator according to the invention, whereby the shaft on the motor rotor is coupled with a rotor shaft in the compressor rotor and whereby the compressor casing is connected to the motor casing, whereby the motor chamber and the compression chamber are not sealed off in relation to each other.

The advantages are similar to those of an actuator according to the invention.

An additional advantage is that the water injection circuit can be coupled or combined with the cooling circuit in the actuator, so that the device has one single integrated water circuit.

In a preferred embodiment, the compressor element is a vertical compressor element, whereby the rotor shafts on the compressor rotors and the shaft on the motor rotor extend, during normal operation of the compressor device, in an axial direction which lies diagonally or perpendicular to the horizontal surface.

An advantage is that this set-up allows a simple operation, whereby the water can simply flow due to gravity over the motor rotor and motor stator and the compressor rotors without the need for further means or energy.

Furthermore, such a set-up takes up less space since the actuator is placed on top of rather than beside the element.

BRIEF DESCRIPTION OF THE DRAWINGS

With the intention of better showing the characteristics of the invention, a preferred embodiment of an actuator for a compressor element and a water-injected compressor device equipped therewith according to the invention is described hereinafter, by way of an example without any limiting nature, with reference to the accompanying drawings, wherein.

DETAILED DESCRIPTION OF THE INVENTION

Figure 1:
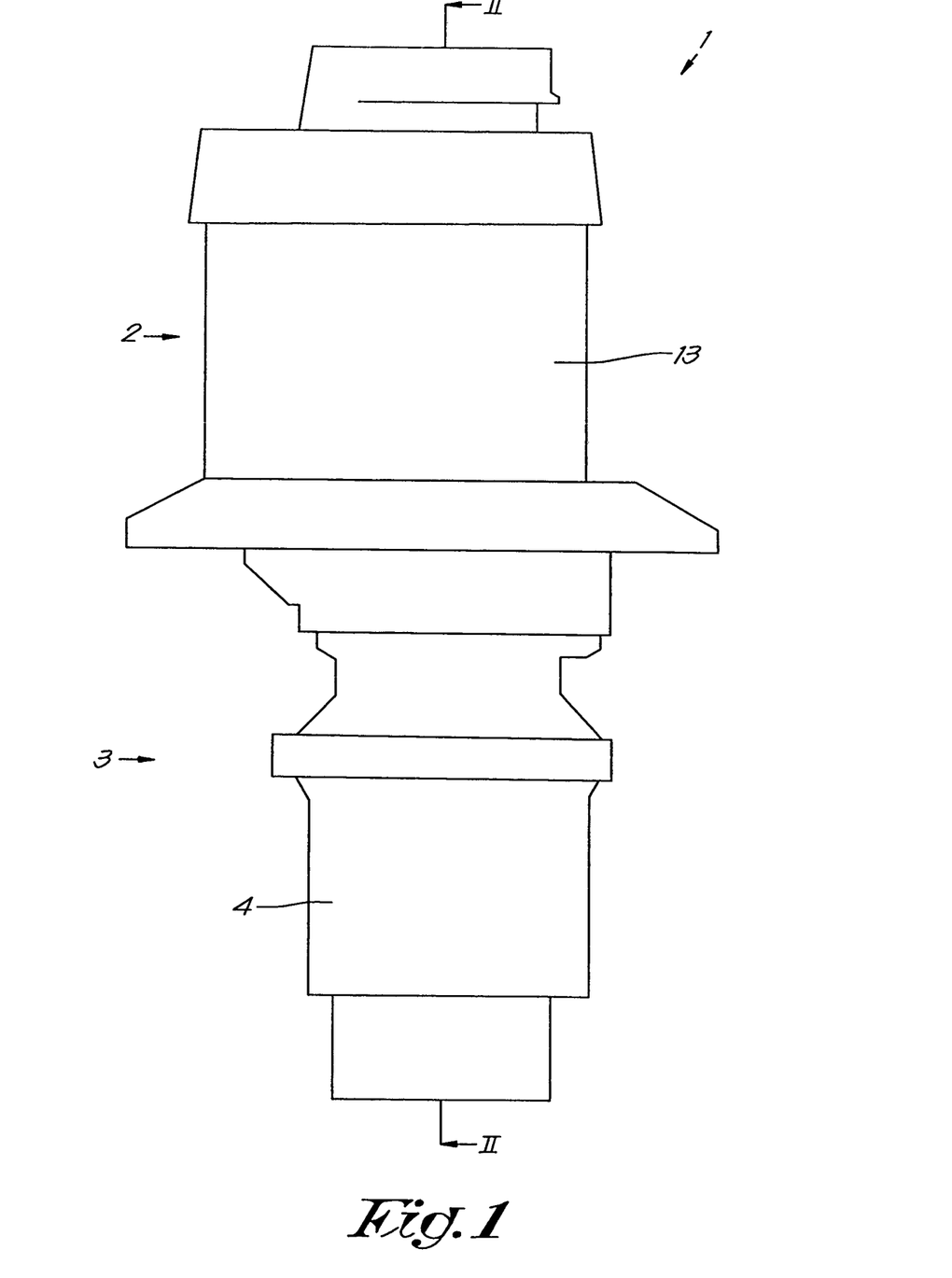
FIG. 1 schematically shows a perspective view of a water-injected compressor device with an actuator according to the invention.
Figure 2:
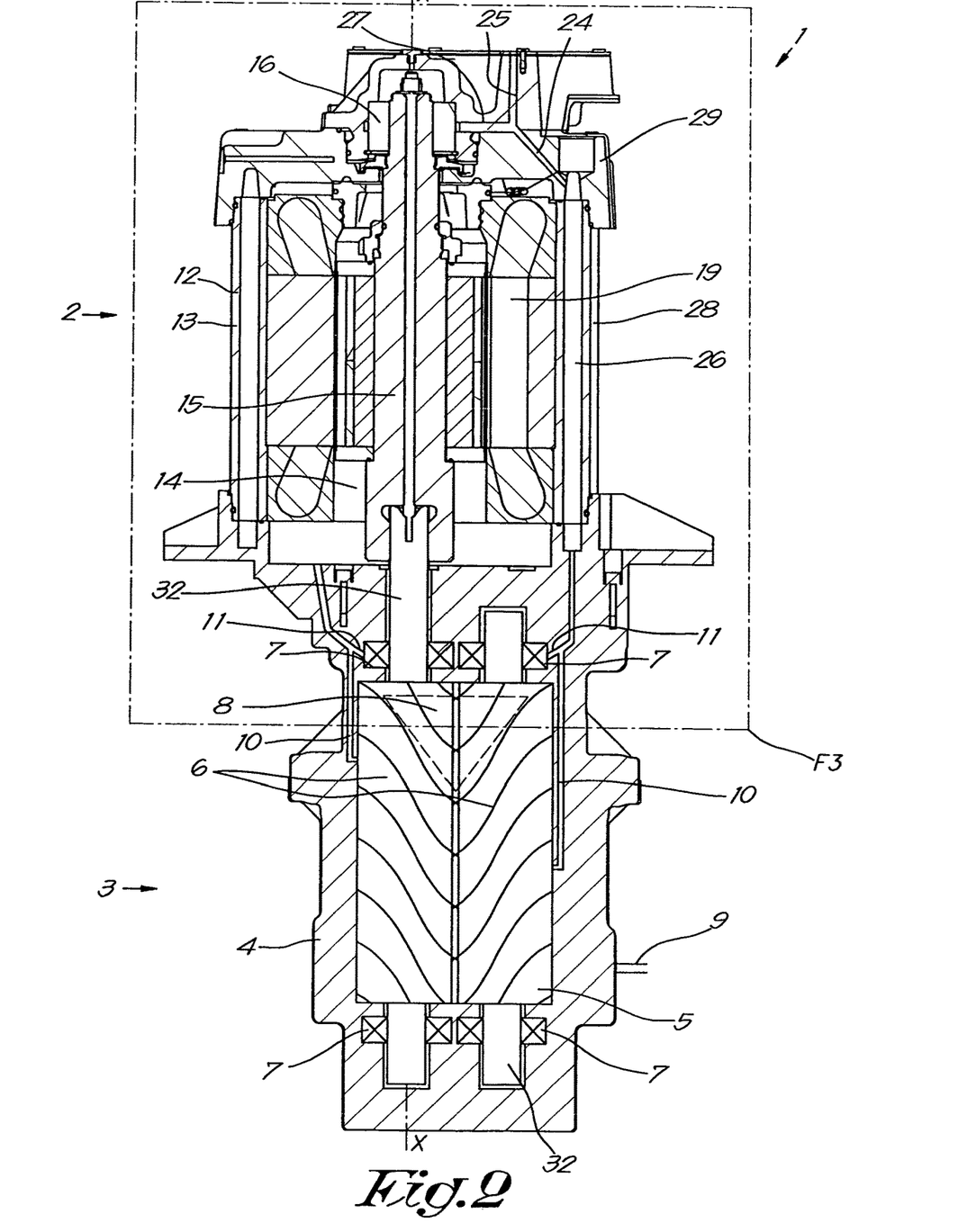
FIG. 2 schematically shows a cross-section along the line II-II in FIG. 1.

FIGS. 1 and 2 schematically show a water-injected compressor device 1 according to the invention, which principally comprises an actuator 2 according to the invention and a water-injected compressor element 3.

The compressor element 3 comprises a compressor casing 4 which defines a compressor chamber 5 in which, in this case, but not necessarily for the invention, two compressor rotors 6 are mounted rotatably.

In this case, but not necessarily, the compressor rotors are mounted with the help of water-lubricated bearings 7.

The compressor casing 4 comprises an inlet 8 for gas to be compressed and an outlet 9 for compressed gas.

The compressor element 3 is equipped with a water injection circuit 10 for the injection of water in the compressor chamber 5, in order to provide cooling and lubrication of the compressor rotors 6.

It also comprises one or more drainage pipes 11 which drain water and lead to the aforementioned water-lubricated bearings 7 for the purpose of cooling and/or lubrication.

Besides the water-injected compressor element 3, the compressor device 1 also comprises an actuator 2 according to the invention. This actuator 2 is shown in detail in FIG. 3.

Figure 3:
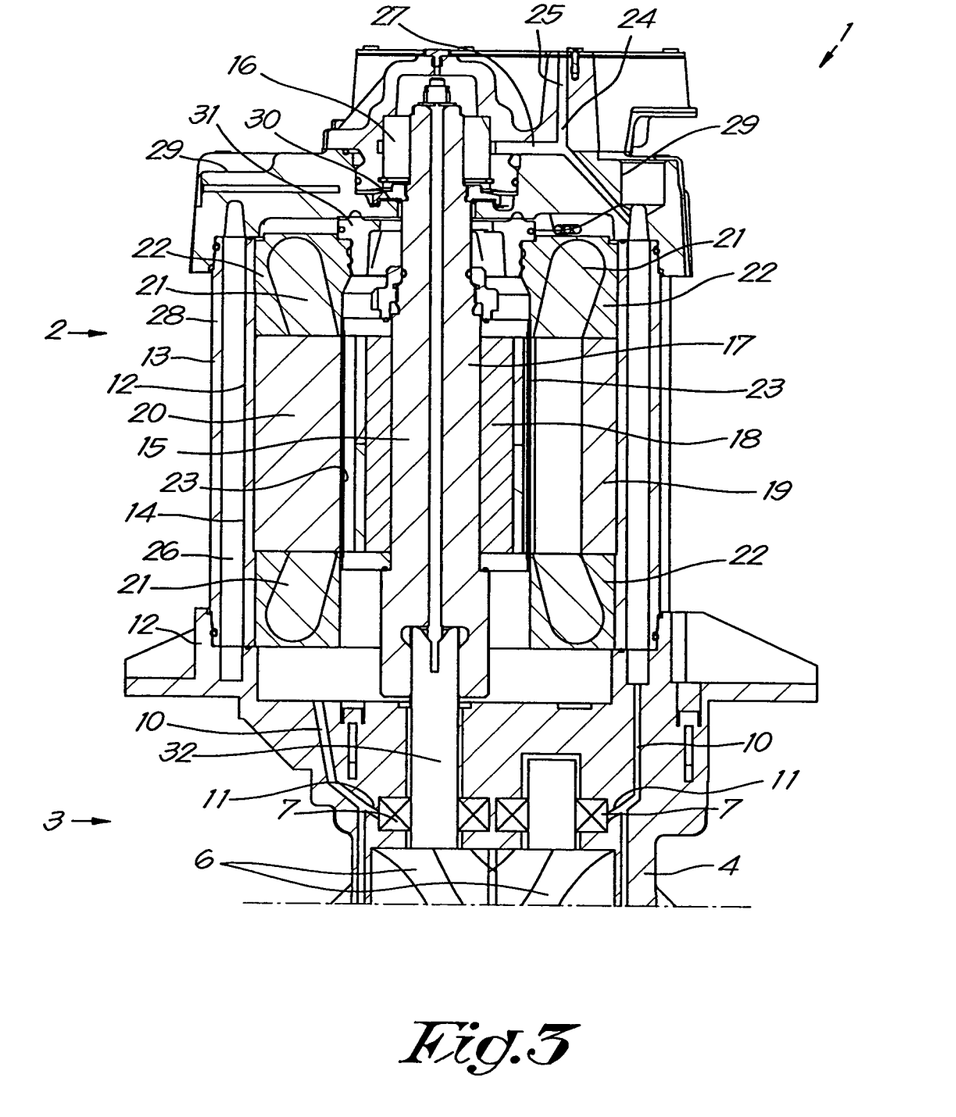
FIG. 3 shows the actuator in FIG. 2 in more detail.

This actuator 2 includes an electric motor 12 with a motor casing 13 defining a motor chamber 14.

In the motor chamber 14 a motor rotor 15 is positioned rotatably using a motor bearing 16, which according to the invention is water-lubricated. The motor bearing 16 is in this case, but not necessarily, a "carbon sliding bearing".

The motor rotor 15 is built of a shaft 17 produced from stainless steel and surrounded by laminations 18.

In the motor chamber 14 there is also a motor stator 19, which extends around the motor rotor 15.

The motor stator 19 comprises laminations 20 around which windings 21 are attached, with the windings being embedded in an epoxy resin 21.

A composite sleeve 23 is applied both around the laminations 18 on the motor rotor 15 and around the laminations 20 on the motor stator 19, as shown in FIG. 3. These sleeves 23 are, for example, built of a carbon fibre composite.

The actuator 2 is further equipped with a cooling circuit for a coolant, in order to cool the actuator 2. The coolant, according to the invention, is water.

This cooling circuit 24 comprises a number of cooling channels 25 in the casing 13, which carries the cooling water to the parts of the actuator 2 to be lubricated and/or cooled and comprises also a cooling case 26 which, in this case, is integrated in the motor casing 13 and in which the water can also circulate in order to cool the motor casing 13.

It is not excluded that the cooling case 26 is attached around the motor casing 13, i.e. not integrated therein.

Also, the cooling circuit 24 is equipped with a branch pipe or branch pipes that branch water from the cooling circuit 24 and lead it to the water-lubricated motor bearings 16 for their lubrication and/or cooling.

As a result, no oil circuit is provided for lubrication of the motor bearings 16 with oil. Obviously, the water-injected compressor element 3 is also free of any oil injection circuit.

The motor casing 13 is provided with a sleeve 28 which forms the motor chamber and in which, in this case, the aforementioned cooling case is integrated, and a flange 29 sealing this sleeve 28.

In the flange 29 a space 30 is provided in which the live wires from the actuator 2 enter, in order to supply the electric motor 12 with electricity. Between this flange 29 and the stator 19 embedded in epoxy, a seal 31 is provided which stops water from infiltrating the space 30 containing the live wires.

The aforementioned actuator 2 will drive the water-injected compressor element 3, whereby the shaft 17 in the motor rotor 15 is coupled with a rotor shaft 32 in the compressor rotor 6 and whereby the compressor casing 4 is connected to the motor casing 13, whereby the motor chamber 14 and the compressor chamber 5 are not sealed off in relation to each other.

The result of this is that water that is injected into the compressor element 3 can enter the actuator 2, and will cause no harm in the actuator 2 according to the invention because the necessary precautions have been taken.

The shaft 17 in the motor rotor 15 is directly coupled to the rotor shaft 32 on one of the compressor rotors 6 and extends in an axial direction X-X' in line with the relevant rotor shaft 32.

It is also possible that the shaft 17 in the motor rotor 15 also forms the rotor shaft 32 of one of the compressor rotors 6, in other words: the shaft 17 in the motor rotor 15 and the rotor shaft 32 are one.

As shown in FIG. 1, the compressor element 3 is a vertical compressor element 3, whereby the rotor shafts 32 in the compressor rotors 6 and the shaft 17 in the motor rotor 15 extend during normal operation of the compressor device 1 in an axial direction X-X' which lies perpendicular to the horizontal surface.

It is also possible that, during normal operation of the compressor device 1, the rotor shafts 32 in the compressor rotors 6 and the shaft 17 in the motor rotor 15 extend in an axial direction X-X' which lies diagonal to the horizontal surface.

In this case, the compressor element 3 forms the foot or lowest part of the compressor device 1, while the actuator 2 forms the head or uppermost part of the compressor device 1.

Besides the coupling between the aforementioned casings 4, 13 and shafts 17, 32, the water injection circuit 10 on the compressor element 3 is also connected to the cooling circuit 24 on the actuator 2 to form an integrated water circuit 10, 24 for the compressor device 1.

Given the fact that the actuator 2 is not sealed off in relation to the compressor element 3, it will be possible to cool and lubricate both using one integrated water circuit 10, 24, whereby cooling water can flow from the actuator 2 to the compressor element 3 and in principle also from the compressor element 3 to the actuator 2.

The operation of the compressor device 1 is very simple and as follows.

During operation, the actuator 2 will drive the compressor element 3, whereby the shaft 17 on the motor rotor 18 will transfer the rotation of the motor rotor 18 to the rotor shaft 32 on the compressor rotor 6, whereby both rotors 6 will rotate.

By rotating, the compressor rotors 6 will compress gas in the known manner, e.g. air, that is sucked in through the inlet 8. The compressed gas will leave the compressor element 3 through the outlet 9.

It goes without saying that, according to the invention, various types of gas or gas mixtures can be compressed and that the invention is not limited to the compression of air.

During its operation, the actuator 2 will generate heat, which needs to be removed, while the motor bearings 16 and the compressor element 3 must be lubricated and cooled.

The integrated water circuit 10, 24 will ensure that water is injected in the motor casing 13 and the compressor casing 4.

The water circuit 10, 24 comprises, on the one hand, the cooling circuit 24 in the actuator 2 and, on the other, the injection circuit 10 in the compressor element 3 and is made of a number of channels 25, 11, 27 which are attached in the compressor casing 4 and in the motor casing 12 and cooling case 26.

These channels 25, 11, 27 will transport water to the parts to be cooled and lubricated, such as the compressor casing 4, the rotors 6, the motor bearings 16 and the bearings 7 in the compressor rotors 6 and to the cooling case 26.

A number of these channels 25, 11, 27 concern the branch pipes 27 and drainage pipes 11 which shall branch or drain water and take it to the motor bearings 16 respectively bearings 7 in the compressor rotors 6.

Water in the water circuit 10, 24 can be sent around using a pump or the pressure generated by the compressor element 3.

The water that is injected in the actuator 2 or at the top of the compressor element 3, will flow, partly due to the pressure built up in the pressure vessel, towards the bottom of the compressor element 3.

Given that there are no special seals provided in the actuator 2, small leakage flows will occur in the motor as water flows through the actuator 2, which will cause no harm because the various electromagnetic and electrical elements in the actuator 2 are protected.

Leakage flows from the compressor element 3 to the actuator 2 are also possible, given that there are no seals or gaskets provided between the motor casing 13 and the compressor casing 4, and these leakage flows similarly cause no harm.

In addition to cooling the water circuit, the epoxy resin 22, in which the windings 21 on the motor stator 19 are embedded, also acts to conduct heat better.

It is known that most heat is generated in the windings 21 on the motor stator 19 of an electrical motor. The epoxy resin 22 will conduct heat better than air, which is what surrounds the windings 21 in known electrical motors. Thanks to this improved conduction of heat, the heat can also be removed better, resulting in better cooling of the actuator 2.

Figure 4:
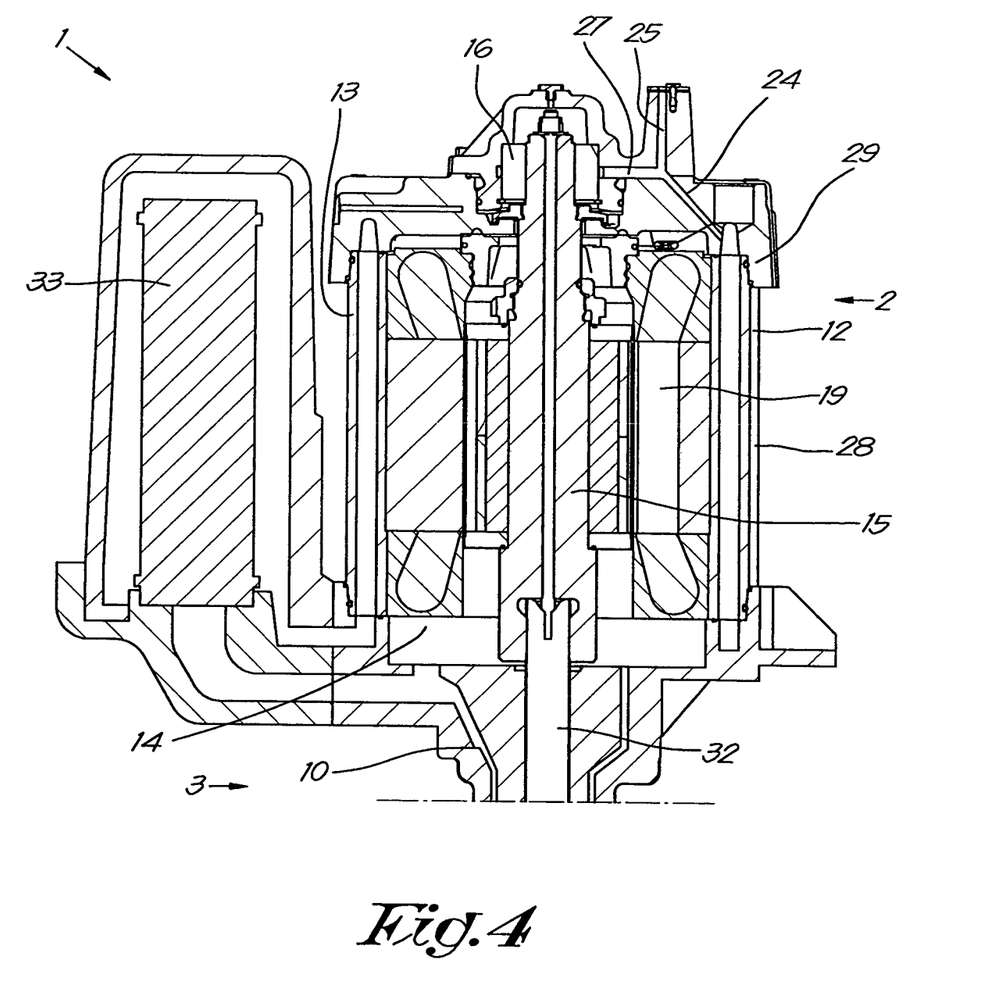
FIG. 4 shows an alternative embodiment of FIG. 3.

It is possible that the cooling circuit 24 on the actuator 2 is also equipped with a water filter 33, which is coupled to, attached to or integrated within the motor casing 13.

Such an actuator 2 is shown in FIG. 4, where the water filter 33 is attached to the motor casing 13.

This water filter 33 will filter the water in the cooling circuit 24 and the injection circuit 10, so that any impurities present are removed from the water.

The filtered water is preferably then first sent to the motor bearing 16 and to the compressor rotors 6.

It is clear that the water filter 32 can be implemented in different ways.

Figure 5:
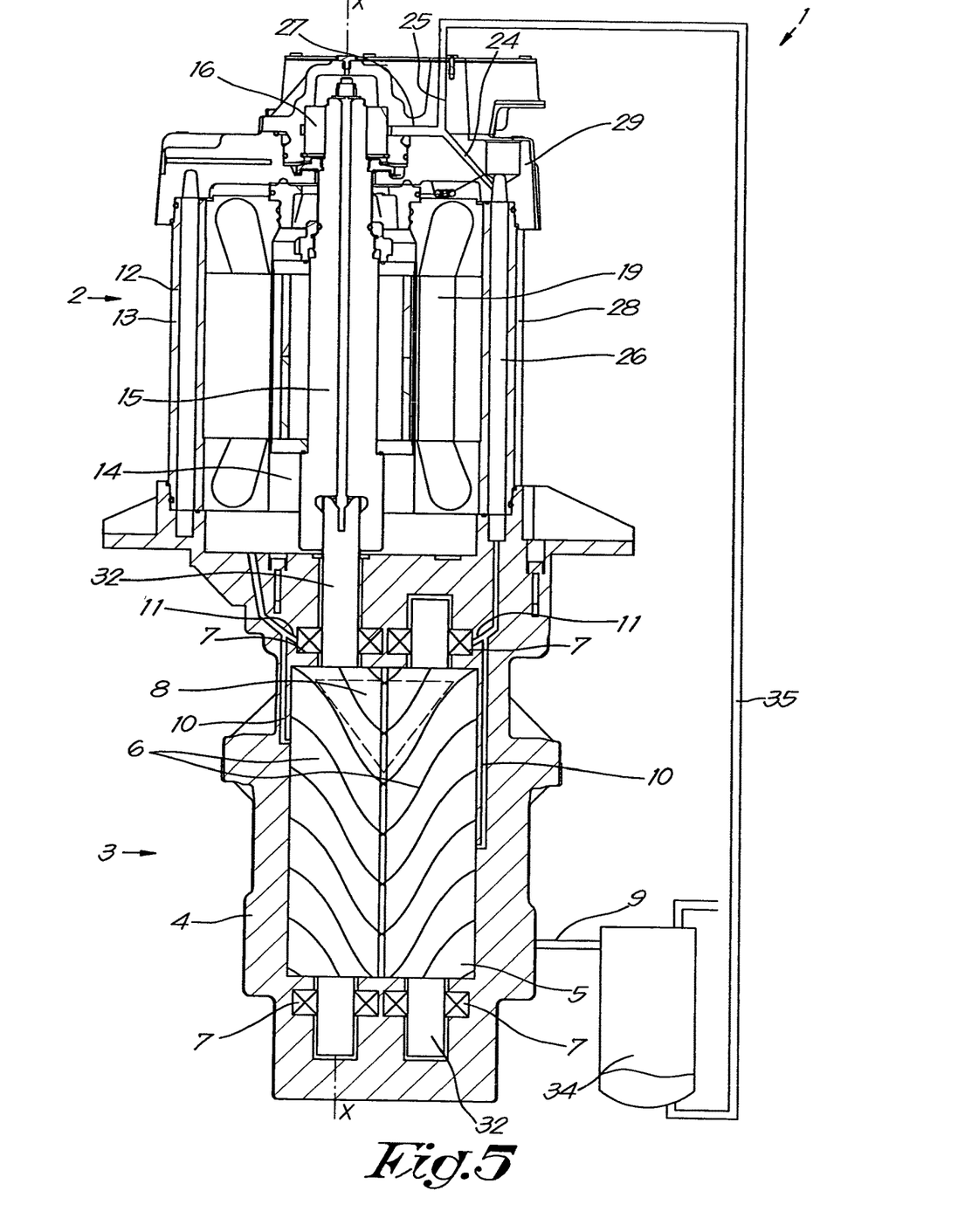
FIG. 5 shows an alternative embodiment of FIG. 2.

FIG. 5 shows an alternative embodiment of FIG. 2, whereby the water circuit 10, 24 is equipped with a pressure vessel 34, that is installed downstream of the compressor element 3.

The water that is separated in the pressure vessel 34 is returned to the compressor device 1 via the return pipe 35.

In this way, a closed water circuit 10, 24 is formed, whereby the injected water can be reused.

In this case, the return pipe 35 leads to the cooling circuit 24, however, it is also possible that the return pipe leads to the injection circuit 10 or to both the cooling circuit 24 and the injection circuit 10.

The presence of such a pressure vessel 34 is preferred, although not essential for the invention, given that the water for the cooling circuit 24 and/or the injection circuit 10 can also be supplied from elsewhere, i.e. an external source.

It is also possible to apply the water filter 33 in this embodiment.

The present invention is by no means limited to the embodiment described as an example and shown in the drawings, but an actuator according to the invention for a compressor element and a water-injected compressor device equipped therewith can be realised in all kinds of forms and dimensions without departing from the scope of the invention.

The invention claimed is:

1. An actuator for a compressor element, with the actuator comprising an electrical motor with a motor casing which defines a motor chamber in which a motor rotor is positioned rotatably in relation to a motor stator with the help of one or more motor bearings, whereby the motor stator is built of laminations around which windings are applied and whereby the motor rotor is built of a shaft with laminations, whereby the actuator is also equipped with a cooling circuit for a coolant, wherein the coolant is water, the motor bearings are water-lubricated, the shaft on the motor rotor is made from stainless steel, the aforementioned windings are embedded in an epoxy resin and a composite sleeve is applied around each of the laminations on the motor rotor and on the motor stator, wherein the water flows due to a gravity over the motor rotor, and wherein the actuator is configured to be oil-free.

2. The actuator according to claim 1, wherein the motor casing is provided with a sleeve which forms the motor chamber and a flange that seals the sleeve, whereby the flange is provided with a space into which live wires enter, whereby a seal is provided between the aforementioned flange and the windings which are embedded in epoxy resin.

3. The actuator according to claim 1, wherein the motor bearing or the motor bearings are formed by one or more carbon sliding bearings.

4. The actuator according to claim 1, wherein the actuator is equipped with a cooling case which is applied around the motor casing or is integrated in the motor casing, whereby the cooling case is part of or connected to the cooling circuit.

5. The actuator according to claim 1, wherein the cooling circuit is equipped with a branch pipe or branch pipes which branch water from the cooling circuit and towards the motor bearing or motor bearings for the purpose of lubrication and/or cooling.

6. The actuator according to claim 1, wherein the aforementioned sleeves are built of a carbon fibre composite.

7. The actuator according to claim 1, wherein the cooling circuit comprises a water filter which is coupled to, attached to or integrated within the motor casing.

8. A water-injected compressor device with a water-injected compressor element that comprises a compressor casing which defines a compressor chamber in which one or more compressor rotors are attached, whereby the compressor element is equipped with a water injection circuit wherein the water-injected compressor device is equipped with an actuator according to claim 1, whereby the shaft on the motor rotor is coupled with a rotor shaft on the compressor rotor and whereby the compressor casing is connected to the motor casing, whereby the motor chamber and the compressor chamber are not sealed off in relation to each other.

9. The water-injected compressor device according to claim 8, wherein the compressor element is a vertical compressor element, whereby the rotor shafts on the compressor rotors and the shaft on the motor rotor during normal operation of the compressor device extend in an axial direction which lies diagonal or perpendicular to a horizontal surface.

10. The water-injected compressor device according to claim 9, wherein the compressor element forms a foot of lowest part of the compressor device and the actuator forms a head or uppermost part of the compressor device.

11. The water-injected compressor device according to claim 8, wherein the shaft on the motor rotor is directly coupled to the rotor shaft on one of the compressor rotors and extends in an axial direction in line with the relevant rotor shaft or that the shaft on the motor rotor also forms the rotor shaft of one of the compressor rotors.

12. The water-injected compressor device according to claim 8, wherein the water injection circuit in the compressor element is connected to the cooling circuit in the actuator to form an integrated water circuit for the compressor device.

13. The water-injected compressor device according to claim 8, wherein the compressor rotors in the compressor chamber are positioned with the help of water-lubricated bearings.

14. The water-injected compressor device according to claim 13, wherein the water injection circuit includes one or more drainage pipes which drain water and lead to the water-lubricated bearings for the purpose of cooling and/or lubrication.

15. The actuator according to claim 1, wherein the water flows due to the gravity over the motor stator.

16. The water-injected compressor device according to claim 8, wherein the water flows due to the gravity over the motor stator and the compressor rotor.

17. An actuator for a compressor element, said actuator comprising an electrical motor, a motor casing which defines a motor chamber, and a motor rotor in the motor chamber, wherein the motor rotor is positioned rotatably in relation to a motor stator by a motor bearing, wherein the motor stator is built of laminations around which windings are applied, wherein the motor rotor is built of a shaft with laminations, wherein the actuator further comprises a cooling circuit for a coolant, wherein the coolant is water, wherein the motor bearing is water-lubricated, wherein the shaft on the motor rotor is made from stainless steel, wherein the windings are embedded in an epoxy resin, wherein a composite sleeve is applied around each of the laminations on the motor rotor and on the motor stator, wherein the actuator is configured for the water to flow due to a gravity over the motor rotor, and wherein the actuator is configured to be oil-free.

* * * * *